(12) United States Patent
Nagato et al.

(10) Patent No.: US 11,328,176 B2
(45) Date of Patent: May 10, 2022

(54) INFORMATION PROCESSING APPARATUS, INFORMATION PROCESSING METHOD, AND STORAGE MEDIUM

(71) Applicant: FUJITSU LIMITED, Kawasaki (JP)

(72) Inventors: Tsuyoshi Nagato, Isehara (JP); Hiroaki Okamoto, Atsugi (JP); Tetsuo Koezuka, Hachioji (JP)

(73) Assignee: FUJITSU LIMITED, Kawasaki (JP)

( * ) Notice: Subject to any disclaimer, the term of this patent is extended or adjusted under 35 U.S.C. 154(b) by 308 days.

(21) Appl. No.: 16/810,908

(22) Filed: Mar. 6, 2020

(65) Prior Publication Data

US 2020/0202169 A1 Jun. 25, 2020

Related U.S. Application Data

(63) Continuation of application No. PCT/JP2017/032672, filed on Sep. 11, 2017.

(51) Int. Cl.
*G06K 9/62* (2022.01)
*G06N 20/00* (2019.01)
*G06N 3/12* (2006.01)

(52) U.S. Cl.
CPC ......... *G06K 9/6227* (2013.01); *G06K 9/6262* (2013.01); *G06N 3/126* (2013.01); *G06N 20/00* (2019.01)

(58) Field of Classification Search
CPC .............. G06N 3/0454; G06N 3/08; G06T 2207/20081; G06T 2207/20084
See application file for complete search history.

(56) References Cited

U.S. PATENT DOCUMENTS 7,149,262 B1 * 12/2006 Nayar ................... G06T 3/4015
375/341
7,603,000 B2 * 10/2009 Zheng .................. G06K 9/6255
382/286

(Continued)

FOREIGN PATENT DOCUMENTS

| JP | 2008-204102 A | 9/2008 |
| JP | 2008-204103 A | 9/2008 |
| JP | 2017-010475 A | 1/2017 |

OTHER PUBLICATIONS

Extended European Search Report dated Aug. 18, 2020 for corresponding to European Patent Application No. 17924616.0, 7 pages.

(Continued)

*Primary Examiner* — Yosef Kassa
(74) *Attorney, Agent, or Firm* — Fujitsu Patent Center (57) ABSTRACT

An information processing apparatus includes a memory; and a processor configured to determine a plurality of initial image processing programs and to add the initial image processing programs to an image processing program group, extract at least two image processing programs from the image processing program group, generate a candidate of a next-generation image processing program from the extracted image processing programs, based on genetic programming, calculate a fitness of the candidate of the next-generation image processing program, using a learning data item including an input image and a target processing result, and determine the next-generation image processing program or update the image processing program group based on the calculated fitness, wherein the processor is configured to determine, as some of the initial image processing programs, at least some of first image processing programs included in the image processing program group upon previous determination of a next-generation image processing program.

8 Claims, 7 Drawing Sheets

(56) References Cited

U.S. PATENT DOCUMENTS

| | | | | |
|---|---|---|---|---|
| 8,111,923 | B2* | 2/2012 | Csurka | G06V 10/267 |
| | | | | 382/190 |
| 8,649,631 | B2* | 2/2014 | Islam | G06V 10/898 |
| | | | | 382/278 |
| 9,014,449 | B2* | 4/2015 | Zhong | G06T 7/143 |
| | | | | 382/128 |
| 10,255,681 | B2* | 4/2019 | Price | G06N 3/088 |
| 2015/0287160 | A1 | 10/2015 | Nagato et al. | |
| 2016/0379088 | A1 | 12/2016 | Nagato et al. | |
| 2017/0083295 | A1 | 3/2017 | Nagato et al. | |

OTHER PUBLICATIONS

Shinya Aoki et al., ACTIT: Automatic Construction of Tree-structural Image Transformations, Journal of the Institute ot Information and Media Engineers, vol. 53, No. 6, pp. 888-894, Jun. 20, 1999 (Total 7 pages).

Kazuhiro Miyajima et al., "Forking Genetic Programming with Blocking and Shrinking Modes", The Heisei 12 IEICE Shinetsu Section Convention Record, pp. 335-336, Oct. 2000 (Total 2 pages).

Takayoshi Naemura et al., "Hierarchical Module Generation in Genetic Programming and Its Incremental Evolution", Transactions of the Society of Instrument and Control Engineers, vol. 35, No. 10, pp. 1292-1299, Oct. 27, 1999 (Total 3 pages).

International Search Report and Written Opinion of the International Searching Authority (Form PCT/ISA/210, 220, and 237), mailed in connection with PCT/JP2017/032672 and dated Nov. 14, 2017 (9 pages).

\* cited by examiner

INFORMATION PROCESSING APPARATUS, INFORMATION PROCESSING METHOD, AND STORAGE MEDIUM

CROSS-REFERENCE TO RELATED APPLICATION

This application is a continuation application of International Application PCT/JP2017/032672 filed on Sep. 11, 2017 and designated the U.S., the entire contents of which are incorporated herein by reference.

FIELD

The embodiments discussed herein are related to an information processing apparatus, an information processing method, and a storage medium.

BACKGROUND

In visual inspection and the like for industrial products, an image capturing device has been used for capturing an image of an appearance of an industrial product to make a determination as to presence or absence of a defect. In the field of factory automation (FA), variations and the like in noise, shade, and brightness according to image capturing environments on a site frequently exert an influence upon a captured image. Therefore, actualization of a robust process for such an environmental change has been desired as to an image processing program for extracting a defect portion. In operating a visual inspection apparatus for inspecting an appearance of an industrial product, when an inspection environment changes due to a change in an inspection target and improvement in a visual inspection apparatus, reconstruction of the image processing program is desired in some instances. For this reason, a visual inspection apparatus is desired to easily construct an image processing method.

An image processing apparatus for use in a visual inspection apparatus obtains an output image in such a manner that an image captured by a camera or the like is subjected to image processing using an image processing filter. With regard to an image processing apparatus, there has been known a technique of automatically generating an image processing filter by evolutionary computation based on genetic programming (GP). According to this technique, an individual indicative of an image processing program is represented by a tree structure having one or more nodes that respectively correspond to image processing program elements (image processing filters). A child individual is generated on the basis of a parent individual in a certain generation, and image processing based on the child individual is executed with an input image given as learning data. A fitness of the child individual is calculated from a comparison of the processing result with a target processing result (e.g., a target image) given as learning data. An image processing program is optimized by selecting an individual to be replaced upon alternation of generations, on the basis of a fitness. For example, Japanese Laid-open Patent Publication No. 2008-204102, Japanese Laid-open Patent Publication No. 2008-204103, Shinya Aoki and Tomoharu Nagao, "ACTIT: Automatic Construction of Tree-structural Image Transformations", Journal of the Institute of Information and Media Engineers, Vol. 53, No. 6, p. 888-894, Jun. 20, 1999, and the like are disclosed as the related art.

SUMMARY

According to an aspect of the embodiments, an information processing apparatus includes a memory; and a processor coupled to the memory and the processor configured to determine a plurality of initial image processing programs and to add the initial image processing programs to an image processing program group, extract at least two image processing programs from the image processing program group, generate a candidate of a next-generation image processing program from the extracted image processing programs, based on genetic programming; calculate a fitness of the candidate of the next-generation image processing program, using a learning data item including an input image and a target processing result, and determine the next-generation image processing program or update the image processing program group based on the calculated fitness, wherein the processor is configured to determine, as some of the initial image processing programs, at least some of first image processing programs included in the image processing program group upon previous determination of a next-generation image processing program.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

In modifying an image processing program due to a change in an image capturing environment, desirably, an image processing program is automatically generated again (relearned) on the basis of genetic programming. In this case, learning data (an input image, a target image) that is newly generated from a captured image after the environmental change is used. The basic learning flow is similar to that of automatic generation executed before the environmental change.

In many instances, however, relearning of an image processing program is desirably executed quicker than learning to be executed at an initial stage; therefore, ingenuity for reduction in time for relearning is desired. A time for relearning of an image processing program is desirably reduced in view of the circumstances described above.

With reference to FIGS. 1 to 7, hereinafter, a specific description will be given of an information processing apparatus according to an embodiment.

Figure 1:
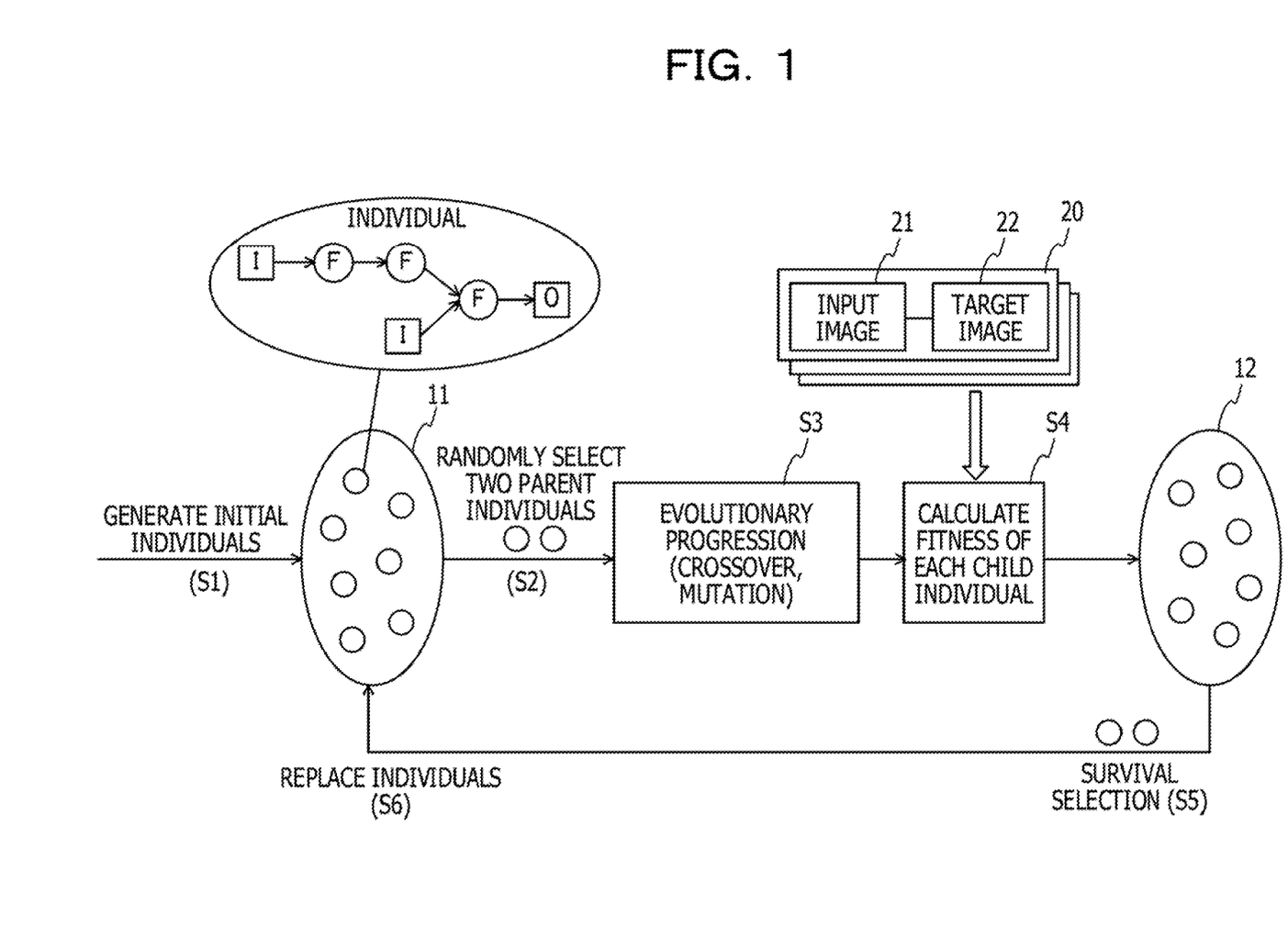
FIG. 1 illustrates an outline of an image processing program generating process according to an embodiment.

With reference to FIG. 1, first, a description will be given of an outline of an image processing program generating process based on genetic programming.

(Outline of Image Processing Program Generating Process)

FIG. 1 illustrates an outline of an image processing program generating process procedure. As a premise, one or more learning data items are prepared prior to an image processing program generating process. Each learning data item 20 includes an input image 21 and a processing result (a target image 22 in the present embodiment) of image processing on the input image 21. The input image 21 is obtained in such a manner that, for example, an image of a subject is captured by a camera.

In the image processing program generating process based on genetic programming, an individual (indicated with a white circle in FIG. 1) is constituted of a combination of one or more image processing filters. For example, as illustrated in the upper left side of FIG. 1, an Individual is defined with a tree structure, and an image processing filter is incorporated in each node of the tree structure. In the upper left side of FIG. 1, "F" represents an image processing filter incorporated in a node, "I" represents an input terminal, and "O" represents an output terminal. A plurality of image processing filters to be incorporated in an individual are also prepared in advance.

For example, the image processing program generating process based on genetic programming is executed as follows.

In step S1, first, a plurality of initial individuals to be included in a population 11 are generated. Image processing filters that are randomly selected from among the plurality of image processing filters prepared in advance are incorporated in nodes of each initial individual. A fitness is calculated for each initial individual thus generated. A specific description on a fitness calculating process will be given later. In a case where a maximum value among the fitnesses thus calculated is equal to or more than a predetermined threshold value, an initial individual having the maximum fitness is output as a definitive image processing program.

In a case where the maximum value among the fitnesses is less than the predetermined threshold value, in step S2, a certain number of parent individuals (e.g., two parent individuals in FIG. 1) are randomly selected from the population 11. In step S3, next, the certain number of parent individuals (two parent individuals) thus selected are subjected to a process of evolutionary progression. A certain number of child individuals, that is, two or more child individuals are thus generated. In the evolutionary progression, two parent individuals are subjected to a crossover process and a mutation process. Three or more child individuals may be generated in such a manner that two parent individuals are respectively subjected to different crossover processes and mutation processes. The number of child individuals to be generated is equal to or more than the number of parent individuals to be selected from the population 11.

In step S4, next, a fitness is calculated for each child individual thus generated.

In a case where the fitness of one of the child individuals thus generated is equal to or more than a predetermined threshold value, the individual is output as a definitive image processing program. The program generating process thus ends.

On the other hand, in a case where the fitnesses of all the child individuals are less than the predetermined threshold value, in step S5, an individual group 12 including each child individual thus generated and the original two parent individuals is subjected to survival selection. In the survival selection, the individual having the maximum fitness calculated is selected from the individual group 12. In addition, one individual is selected from among the remaining individuals in the individual group 12, by a predetermined method. For example, an individual is selected from among the remaining individuals with a probability according to a fitness (roulette selection).

In step S6, the two individuals selected by the survival selection are replaced with the two individuals selected as the parent individuals from among the individuals included in the population 11. The individuals included in the population 11 are thus changed to next-generation individuals. The similar process is repeated until an individual whose fitness is equal to or more than the predetermined threshold value appears.

It is considered as a use that an image processing program to be generated through the procedure described above is used for producing a desired advantageous effect in such a manner that, for example, an image of a product is subjected to image processing in the field of factory automation (FA). For example, it is considered as such a use that an image of an appearance of a product is subjected to image processing in order to extract a position of a defect or in order to extract a position for alignment.

In such a use, occasionally, an image processing program is reconstructed in accordance with a change or improvement in a product as a subject, a change in an image capturing environment accompanied with the change or improvement, and the like. For this reason, desirably, an image processing program is constructed with ease. In addition, desirably, an image processing program to be constructed has high robustness for changes in image capturing environments including a change in an illumination condition, variations in shape, position, and orientation of a subject, and the like.

Utilizing genetic programming enables, with ease, generation of an image processing program usable in such a use, only by preparing an input image 21 and a target image 22 corresponding to the input image 21 in advance. In addition, preparing multiple pairs (learning data items 20) of input images 21 and target images 22 respectively different in image capturing environment from each other enables automatic generation of an image processing program having high robustness for a change in an image capturing environment. In the following, a process of generating an image processing program first is referred to as an "initial learning process", and a process of reconstructing an image processing program in accordance with, for example, a change in an image capturing environment is referred to as a "relearning process".

(Configuration of Image Processing Apparatus)

Figure 2:
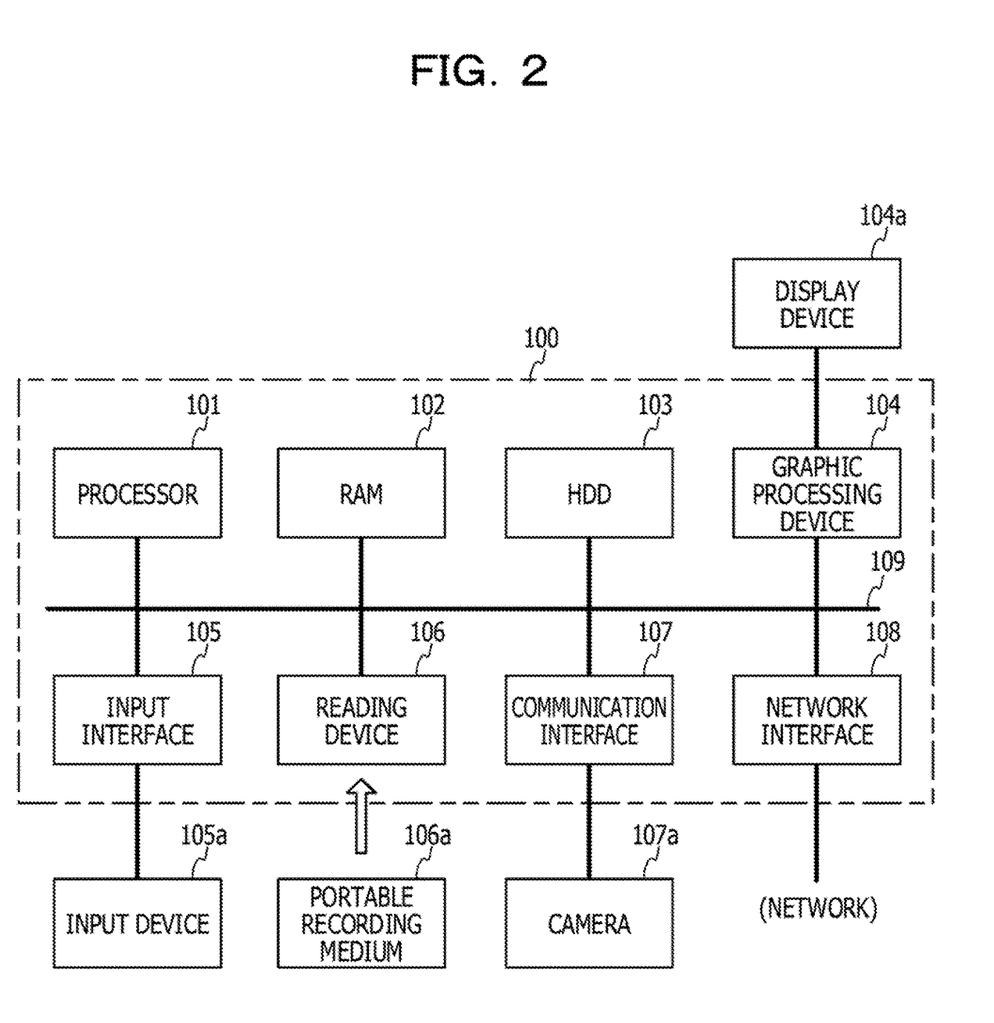
FIG. 2 illustrates a hardware configuration of an image processing apparatus.

With reference to FIG. 2, next, a description will be given of, for example, a configuration of an image processing apparatus 100 as an information processing apparatus configured to execute the foregoing image processing program generating process (the initial learning process, the relearning process). FIG. 2 schematically illustrates an exemplary hardware configuration of the image processing apparatus 100. The image processing apparatus 100 according to the present embodiment is embodied as, for example, a computer (an information processing apparatus) illustrated in FIG. 2.

The image processing apparatus 100 includes a processor 101 configured to control the entire image processing apparatus 100. The processor 101 may be a multiprocessor. Examples of the processor 101 may include a central processing unit (CPU), a micro processing unit (MPU), a digital signal processor (DSP), an application specific integrated circuit (ASIC), a programmable logic device (PLD), and the like. The processor 101 may also be a combination of two or more elements of the CPU, the MPU, the DSP, the ASIC, and the PLD. A RAM 102 and a plurality of devices (peripheral devices) are connected to the processor 101 via a bus 109.

The RAM 102 is used as a main storage device of the image processing apparatus 100. The RAM 102 temporarily stores therein at least some of an operating system (OS) program and an application program to be executed by the processor 101. The RAM 102 also stores therein various kinds of data for a process to be executed by the processor 101.

Examples of the devices connected to the bus 109 may include a hard disk drive (HDD) 103, a graphic processing device 104, an input interface 105, a reading device 106, a communication interface 107, a network interface 108, and the like.

The HDD 103 is used as an auxiliary storage device of the image processing apparatus 100. The HDD 103 stores therein an OS program, an application program, and various kinds of data. Other kinds of nonvolatile storage devices such as a solid state drive (SSD) may be used as the auxiliary storage device.

A display device 104a is connected to the graphic processing device 104. The graphic processing device 104 causes the display device 104a to display an image on a screen of the display device 104a, in accordance with a command from the processor 101. Examples of the display device 104a may include a liquid crystal display, an organic electroluminescence (EL) display, and the like.

An input device 105a is connected to the input interface 105. The input interface 105 receives a signal from the input device 105a, and transmits the signal to the processor 101. Examples of the input device 105a may include a keyboard, a pointing device, and the like. Examples of the pointing device may include a mouse, a touch panel, a tablet, a touch pad, a trackball, and the like.

A portable recording medium 106a is attachable to and detachable from the reading device 106. The reading device 106 reads data recorded on the portable recording medium 106a, and transmits the data to the processor 101. Examples of the portable recording medium 106a may include an optical disk, a magneto-optical disk, a semiconductor memory, and the like.

The communication interface 107 exchanges data with an external device connected thereto. In the present embodiment, a camera 107a as an image capturing device is connected to the communication interface 107, and the communication interface 107 receives image data from the camera 107a, and transmits the image data to the processor 101.

The network interface 108 exchanges data with another device via a network.

(Processing Functions of Image Processing Apparatus 100)

Figure 3:
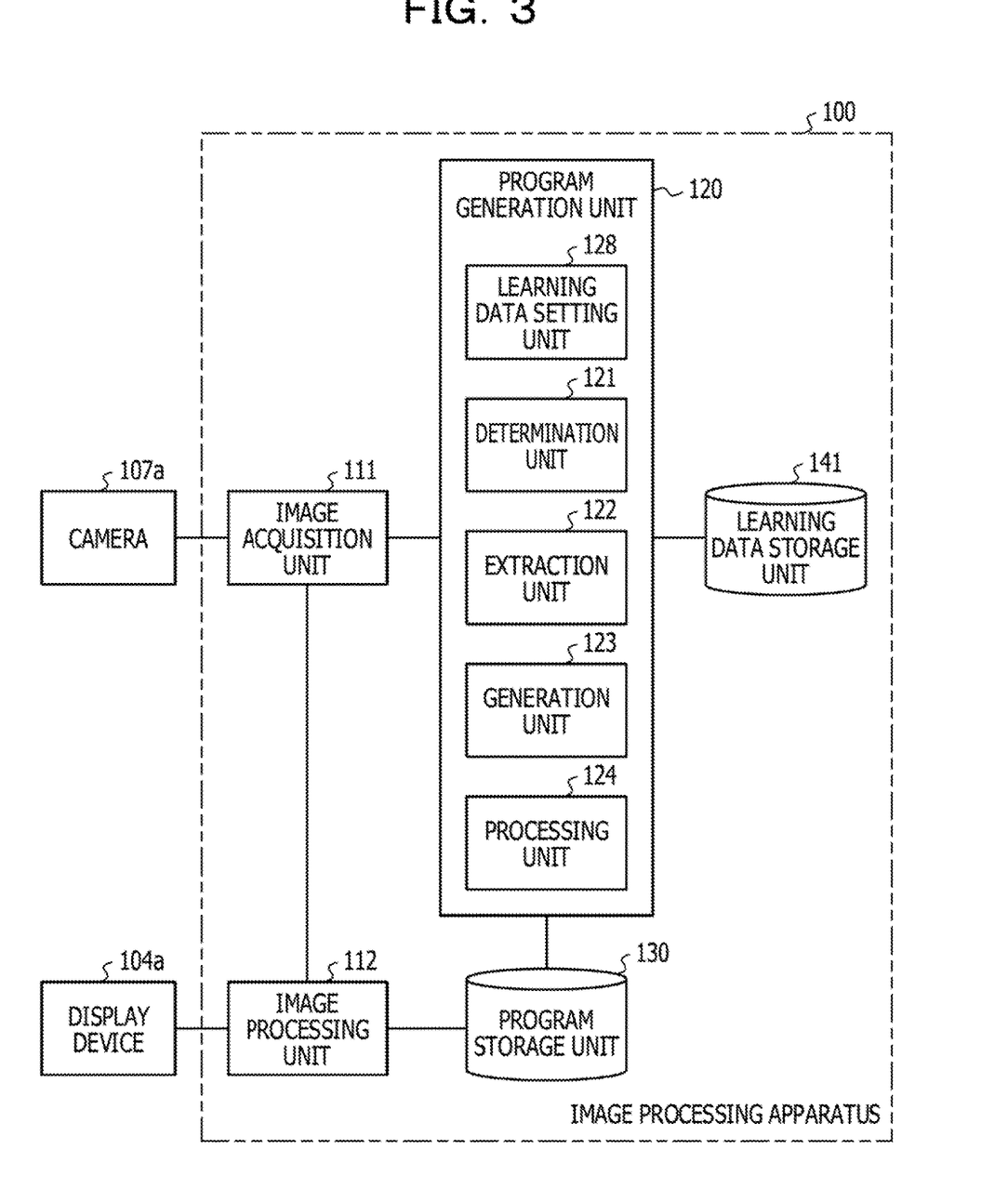
FIG. 3 is a functional block diagram of the image processing apparatus.

FIG. 3 is a block diagram (a functional block diagram) that illustrates exemplary configurations of processing functions of the image processing apparatus. The image processing apparatus 100 includes an image acquisition unit 111, an image processing unit 112, a program generation unit 120, a program storage unit 130, and a learning data storage unit 141. Processes in the image acquisition unit 111, image processing unit 112, and program generation unit 120 are actualized in such a manner that, for example, the processor 101 of the image processing apparatus 100 executes a predetermined program. The process in the image processing unit 112 is partially actualized in such a manner that the processor 101 of the image processing apparatus 100 executes an image processing program stored in the program storage unit 130. Each of the program storage unit 130 and the learning data storage unit 141 serves as, for example, a storage region in the HDD 103 of the image processing apparatus 100.

The image acquisition unit 111 acquires from the camera 107a data on an image captured by the camera 107a, and outputs the data to the program generation unit 120 or the image processing unit 112.

The program generation unit 120 generates an image processing program based on genetic programming, and stores the image processing program thus generated, in the program storage unit 130. A specific description on the program generation unit 120 will be given later.

The image processing unit 112 acquires through the image acquisition unit 111 the data on the image captured by the camera 107a. The image processing unit 112 subjects the image thus acquired, to image processing in accordance with a definitive image processing program (a program for use in image processing) stored in the program storage unit 130. For example, the image subjected to the image processing is displayed on the display device 104a.

The program storage unit 130 stores therein a definitive image processing program generated by the program generation unit 120 at the time of learning or relearning, and an image processing program included in the population 11 at the time when the definitive image processing program is generated.

The learning data storage unit 141 stores therein one or more learning data items each including respective data items on an input image and a target image. An input image included in each learning data item may be, for example, an image captured by the camera 107a connected to the image processing apparatus 100.

In the present embodiment, as an example, an image is output as a result of a process using an image processing program to be generated. Alternatively, Information different from an image may be output as such a processing result. It is considered that such a processing result is, for example, positional information indicating a region in an input image, a classification result of an input image, an evaluation result of an input image, or the like. In a case where a processing result is not an image, a learning data item may include information that is different from an image and indicates a target processing result, in place of a target image.

As illustrated in FIG. 3, the program generation unit 120 includes a learning data setting unit 128, a determination unit 121, an extraction unit 122, a generation unit 123, and a processing unit 124.

The learning data setting unit 128 sets a learning data item. For example, the learning data setting unit 128 designates a learning data item to be used, from among the learning data items stored in the learning data storage unit 141. Alternatively, the learning data setting unit 128 generates a learning data item to be used, on the basis of an image acquired by the image acquisition unit 111, and registers the learning data item in the learning data storage unit 141.

The determination unit 121 determines a plurality of initial individuals (initial image processing programs), and adds the initial individuals to the population 11 (S1 in FIG. 1). A method of determining initial individuals by the determination unit 121 in the initial learning process is different from that in the relearning process. A specific description on the methods will be given later.

The extraction unit 122 extracts a plurality of parent individuals (image processing programs) (e.g., two parent individuals) from the population 11 (S2 in FIG. 1). A method of extracting parent individuals by the extraction unit 122 in the initial learning process is different from that in the relearning process. A specific description on the methods will be given later.

The generation unit 123 generates child individuals from the plurality of parent individuals (e.g., two parent individuals) thus extracted, on the basis of genetic programming (S3 in FIG. 1).

The processing unit 124 calculates a fitness for evaluating an individual (a candidate of a next-generation image processing program), using a learning data item including an input image and a target processing result (S4 in FIG. 1). For example, the processing unit 124 calculates fitnesses of the respective image processing programs, using the learning data items stored in the learning data storage unit 141. The processing unit 124 subjects an input image included in each learning data item to image processing on the basis of an image processing program. The processing unit 124 then calculates, as a fitness of an individual, a similarity of the image thus obtained to a target image corresponding to the input image subjected to the image processing. Moreover, the processing unit 124 determines a next-generation image processing program on the basis of the fitness thus calculated or updates the population 11, using the child individuals generated by the generation unit 123 (S5, S6 in FIG. 1).

(Initial Learning Process by Image Processing Apparatus 100)

Figure 4:
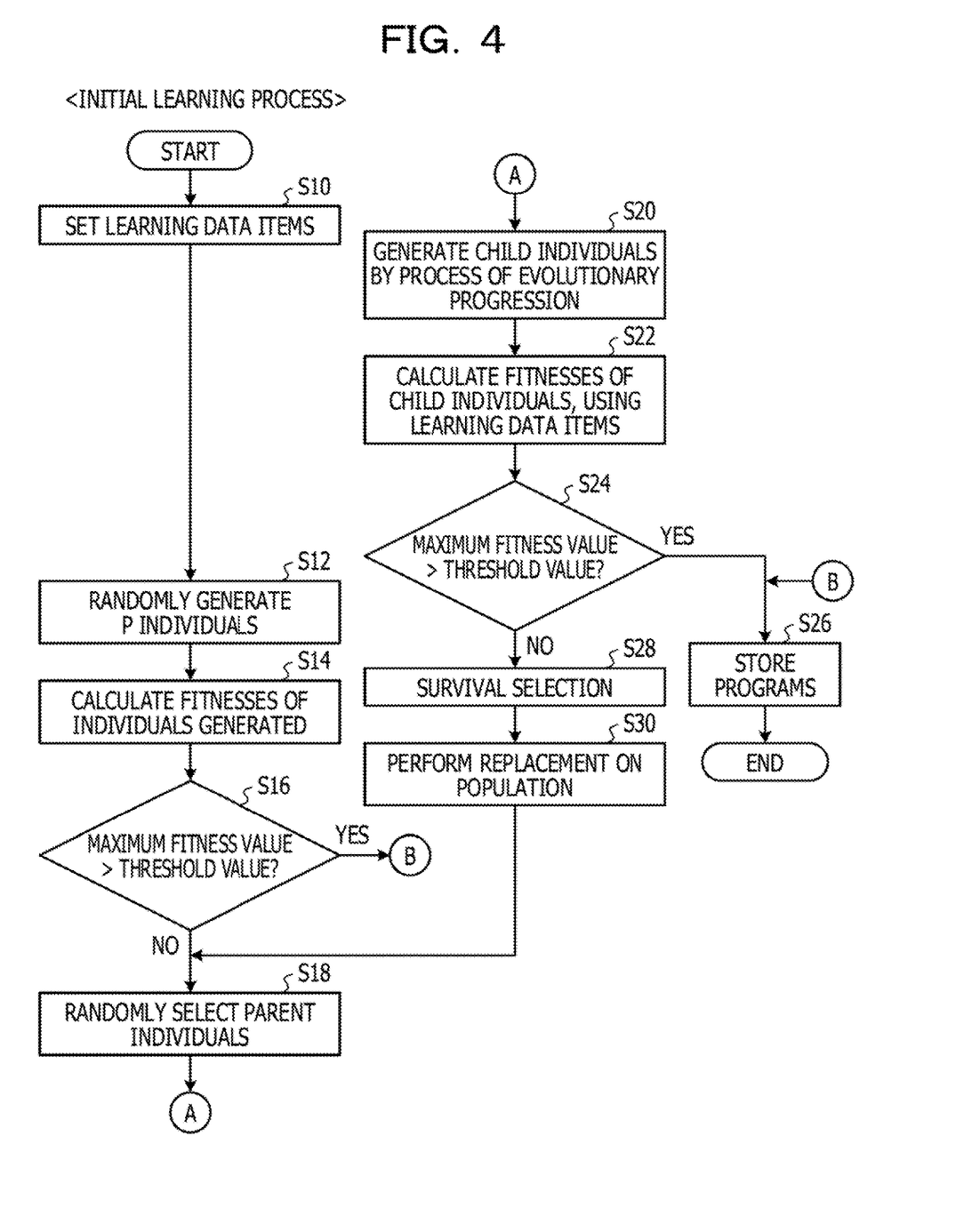
FIG. 4 is a flowchart of an initial learning process.

FIG. 4 is a flowchart of the details of the initial learning process executed by the image processing apparatus 100.

As illustrated in FIG. 4, in step S10, the learning data setting unit 128 sets learning data items. For example, the learning data setting unit 128 designates learning data items to be used in the present process, from among the learning data items stored in the learning data storage unit 141. Alternatively, the learning data setting unit 128 generates learning data items to be used in the present process from images acquired by the image acquisition unit 111, and registers the learning data items in the learning data storage unit 141.

In step S12, next, the determination unit 121 generates a predetermined number of initial individuals (P initial individuals) to be included in the population 11 (see step S1 in FIG. 1). Each initial individual is generated in such a manner that image processing filters are randomly selected and are combined with respective nodes in a tree structure. The tree structures of the respective initial individuals are randomly selected from among, for example, a plurality of predetermined tree structures. Alternatively, the tree structures themselves may be randomly determined.

In step S14, next, the processing unit 124 calculates fitnesses of the individuals included in the population 11, using the learning data items.

In step S16, next, the processing unit 124 determines whether a maximum value among the fitnesses of the respective individuals calculated in step S14 is larger than a predetermined threshold value. In a case where the determination in step S16 is confirmed, the process proceeds to step S26. In step S26, the processing unit 124 sets the individual having the maximum fitness at a definitive image processing program, and stores in the program storage unit 130 the definitive image processing program and the individuals included in the population 11. Thereafter, the process (the initial learning process) in FIG. 4 ends.

On the other hand, in a case where the determination in step S16 is denied (in a case where the population 11 includes no individual as a candidate of a definitive image processing program at this time), the process proceeds to step S18. In step S18, the extraction unit 122 randomly selects two parent individuals from among the individuals included in the population 11 (see step S2 in FIG. 1).

In step S20, next, the generation unit 123 generates child individuals by the process of evolutionary progression (see step S3 in FIG. 1). In this case, the generation unit 123 performs crossover on the two parent individual thus selected, thereby generating a predetermined number of child individuals, that is, two or more child individuals. Moreover, the generation unit 123 causes mutation of a node in one of the child individuals thus generated, and replaces, with another image processing filter, the image processing fitter incorporated in the node of the original child individual.

In step S22, next, the processing unit 124 calculates fitnesses of the respective child individuals, using the learning data items. This process is similar to the foregoing process in step S14.

In step S24, next, the processing unit 124 specifies a maximum one of the fitnesses of the respective child individuals calculated in step S22, and determines whether the maximum fitness is larger than a predetermined threshold value. In a case where the maximum fitness is larger than the threshold value, the process proceeds to step S26. In a case where the maximum fitness is equal to or less than the threshold value, the process proceeds to step S28.

In step S28, the processing unit 124 selects, as an individual to be survived, the individual having the maximum fitness from among the respective parent individuals selected in step S18 and the respective child individuals generated in step S20 (see step S5 in FIG. 1). The processing unit 124 also selects one individual to be survived, from among the remaining individuals. In this selection, an individual to be survived is selected with a probability according to each of the fitnesses of the remaining individuals (roulette selection).

In step S30, next, the processing unit 124 replaces the parent individuals selected in step S18 from among the individuals included in the population 11, with the two individuals selected in step S28 (see step S6 in FIG. 1). The generation of the population 11 is thus updated. Thereafter, the process returns to step S18, and the process in and subsequent to step S18 is executed as described above.

On the other hand, when the determination in step S24 is confirmed so that the process proceeds to step S26, the processing unit 124 stores in the program storage unit 130 the individual (the image processing program) whose fitness is determined to be larger than the threshold value in step S24. The processing unit 124 also stores in the program storage unit 130 the individuals (the image processing programs) included in the population 11. The process (the initial learning process) in FIG. 4 thus ends. The definitive image processing program stored in the program storage unit 130 and the individuals included in the population 11 are utilized in the relearning process to be executed next.

(Relearning Process by Image Processing Apparatus 100)

Figure 5:
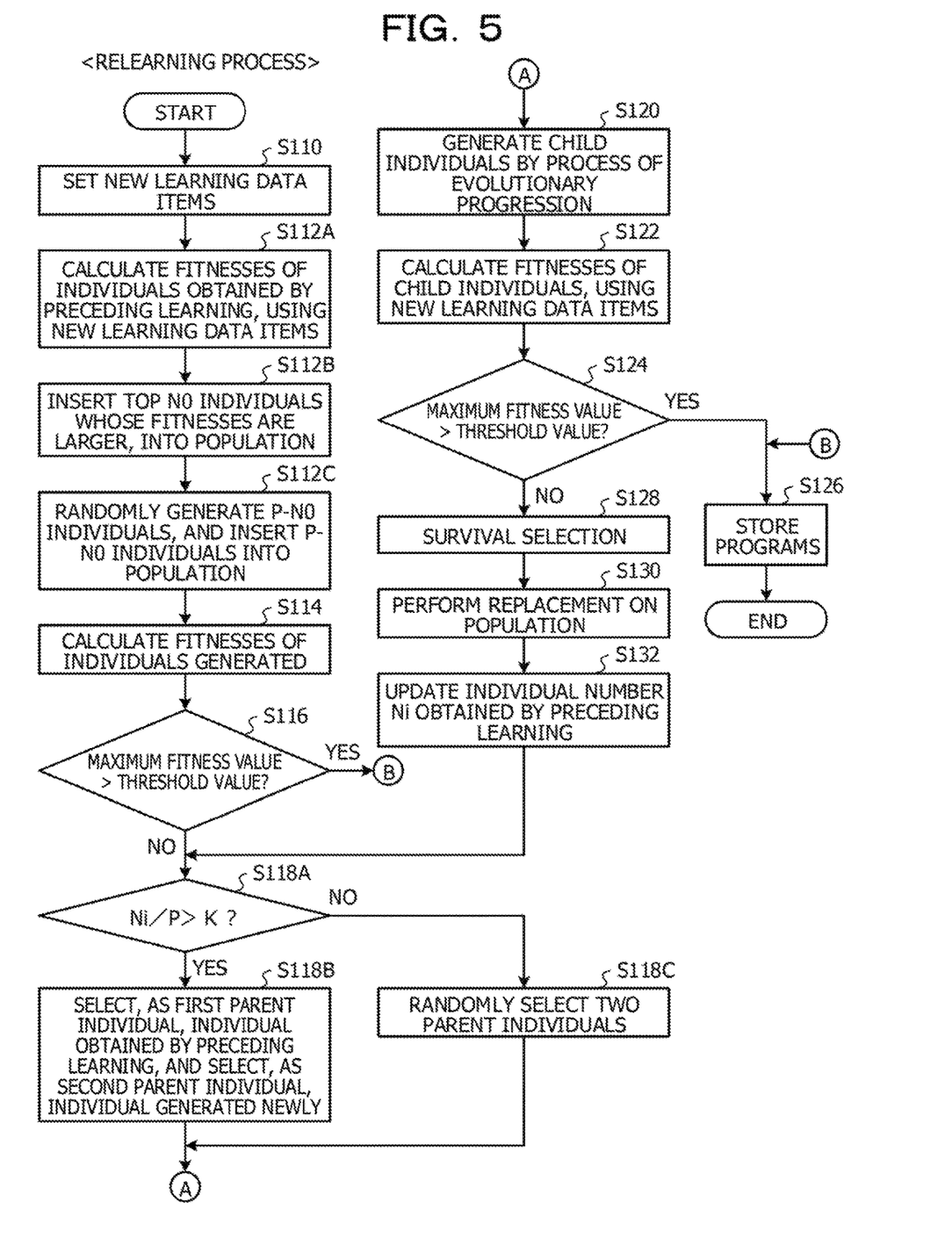
FIG. 5 is a flowchart of a relearning process.
Figure 6:
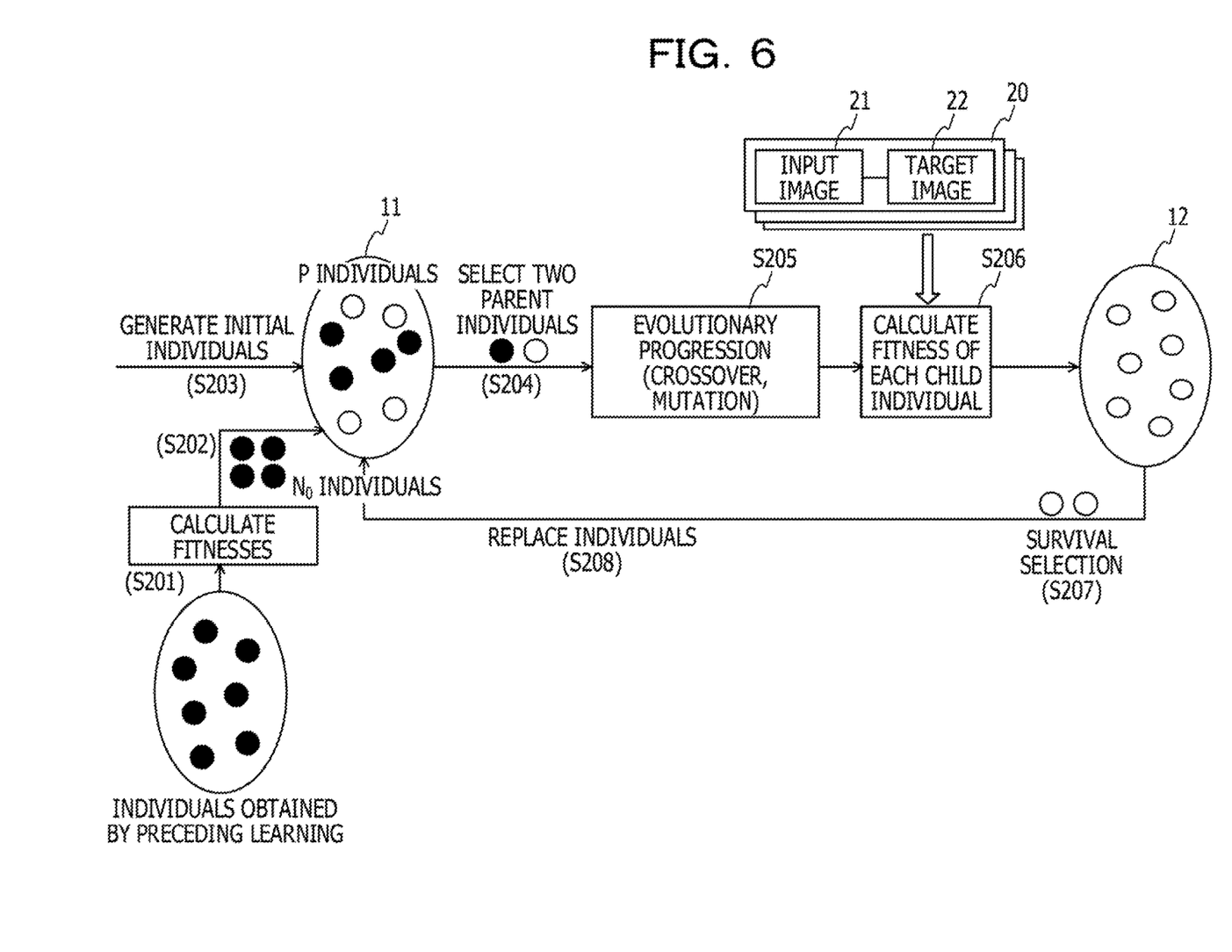
FIG. 6 illustrates an outline of the image processing program relearning process.

With reference to a flowchart of FIG. 5 and FIG. 6 illustrating an outline of the relearning process, next, a specific description will be given of the relearning process executed by the image processing apparatus 100. This relearning process is a process to be executed at the time when modification of an image processing program is desired due to, for example, occurrence of a change in an image capturing environment while image processing is repeatedly executed using the image processing program determined by the method illustrated in FIG. 4.

In the process illustrated in FIG. 5, first, in step S110, the learning data setting unit 128 sets new learning data items.

In this case, the learning data setting unit 128 generates new learning data items, using images captured by the camera 107a after, for example, occurrence of a change in an image capturing environment. The learning data setting unit 128 then registers the new learning data items in the learning data storage unit 141.

In step S112A, next, the processing unit 124 calculates fitnesses of individuals stored in the program DB 130 at the time of a preceding learning process (a definitive image processing program in the preceding learning and individuals included in the population 11), using the new learning data items generated in step S110 (see step S201 in FIG. 6).

In step S112B, next, the processing unit 124 inserts top $N_0$ individuals whose fitnesses are larger, into the population 11 (see step S202 in FIG. 6). Herein, $N_0$ may be, for example, 50% of a total individual number P in the population 11 ($N_0=0.5\times P$).

In step S112C, next, the processing unit 124 randomly generates $P-N_0$ individuals, and inserts the $P-N_0$ individuals into the population 11 (see step S203 in FIG. 6). The process in step S112C is similar to the process in step S12 illustrated in FIG. 4.

In step S114, next, the processing unit 124 calculates fitnesses of the respective individuals randomly generated in step S112C.

In step S116, next, the processing unit 124 determines whether a maximum value among the fitnesses of the respective individuals calculated in steps S112A and S114 is larger than a predetermined threshold value. In a case where the determination in step S116 is confirmed, the process proceeds to step S126. In step S126, the processing unit 124 sets the individual having the maximum fitness at a definitive image processing program, and stores in the program storage unit 130 the definitive image processing program and the individuals included in the population 11. Thereafter, the process (the relearning process) in FIG. 5 ends.

On the other hand, in a case where the determination in step S116 is denied (in a case where the population 11 includes no individual as a candidate of a definitive image processing program), the process proceeds to step S118A. In step S118A, the extraction unit 122 determines whether $N_i/P$ is larger than K. It is assumed herein that K is, for example, 0.1. Herein, $N_i$ represents the number of individuals that are obtained by the preceding learning and are included in the population. For example, if the population includes 20 individuals and 10 individuals of the 20 individuals are obtained by the preceding learning, a relation of $N_i/P=1/2$ is established. It is therefore determined that $N_i/P$ is larger than K (=0.1). The determination in step S118A is thus confirmed. On the other hand, when the individuals obtained by the preceding learning are selected as parent individuals as will be described later, the number of individuals in the population 11 is reduced. As a result, in a case where $N_i/P$ is smaller than K, the determination in step S118A is denied. In the case where the determination in step S118A is confirmed, the process proceeds to step S118B. In the case where the determination in step 118A is denied, the process proceeds to step S118C.

In step S118B, the extraction unit 122 selects, as a first parent individual, an individual that is obtained by the preceding learning and is included in the population 11, and also selects, as a second parent individual, an individual that is newly generated and is included in the population 11 (see step S204 in FIG. 6).

In step S118C, the extraction unit 122 randomly selects two parent individuals from the population 11 (see step S204 in FIG. 6).

In step S120, next, as in step S20 illustrated in FIG. 4, the generation unit 123 generates child individuals by the process of evolutionary progression (see step S205 in FIG. 6). In step S122, next, the processing unit 124 calculates fitnesses of the respective child individuals, using the new learning data items (see step S206 in FIG. 6).

In step S124, next, as in step S24, the processing unit 124 specifies a maximum one of the fitnesses of the respective child individuals calculated in step S122, and determines whether the maximum fitness is larger than a predetermined threshold value. In a case where the maximum fitness is larger than the threshold value, the process proceeds to step S126. In a case where the maximum fitness is equal to or less than the threshold value, the process proceeds to step S128.

In step S128, the processing unit 124 selects, as an individual to be survived, the individual having the maximum fitness from among the respective parent individuals selected in step S118B or 118C and the respective child individuals generated in step S120. The processing unit 124 also selects by roulette selection one individual to be survived, from among the remaining individuals (see step S207 in FIG. 6).

In step S130, next, the processing unit 124 replaces the parent individuals selected in step S118B or S118C from among the individuals included in the population 11, with the two individuals selected in step S128 (see step S208 in FIG. 6). The generation of the population 11 is thus updated. In step S132, thereafter, the processing unit 124 updates the number $N_i$ of individuals that are obtained by the preceding learning and are included in the population 11. Herein, i represents a value indicating how many times the loop (S2104 to S208) illustrated in FIG. 6 is executed. For example, in a case where one of the parent individuals selected in step S118B or S118C is an individual obtained by the preceding learning, $N_{i+1}$ is decreased from $N_i$ by one. In a case where both the parent individuals are individuals obtained by the preceding learning, $N_{i+1}$ is decreased from $N_i$ by two. In a case where both the parent individuals are not individuals obtained by the preceding learning, $N_{i+1}$ does not change from $N_i$. After step S132, the process proceeds to step S118A.

When the determination in step S124 is confirmed so that the process proceeds to step S126, the processing unit 124 stores in the program storage unit 130 the individual (the image processing program) whose fitness is determined to be larger than the threshold value in step S124. The processing unit 124 also stores in the program storage unit 130 the individuals (the image processing programs) included in the population 11. The process (the relearning process) in FIG. 5 then ends. The image processing programs stored in the program storage unit 130 in step S126 are utilized in step S112A in the next relearning.

In the relearning process, as described above, the image processing programs obtained by the preceding learning are used as some of the initial individuals in the population 11 at the time of relearning. This configuration therefore enables a search for an individual having a higher fitness at an early stage. In addition, the image processing programs obtained by the preceding learning are not used as all of the initial individuals in the relearning process. This configuration therefore enables prevention of an excessive learning state in the preceding learning.

Figure 7:
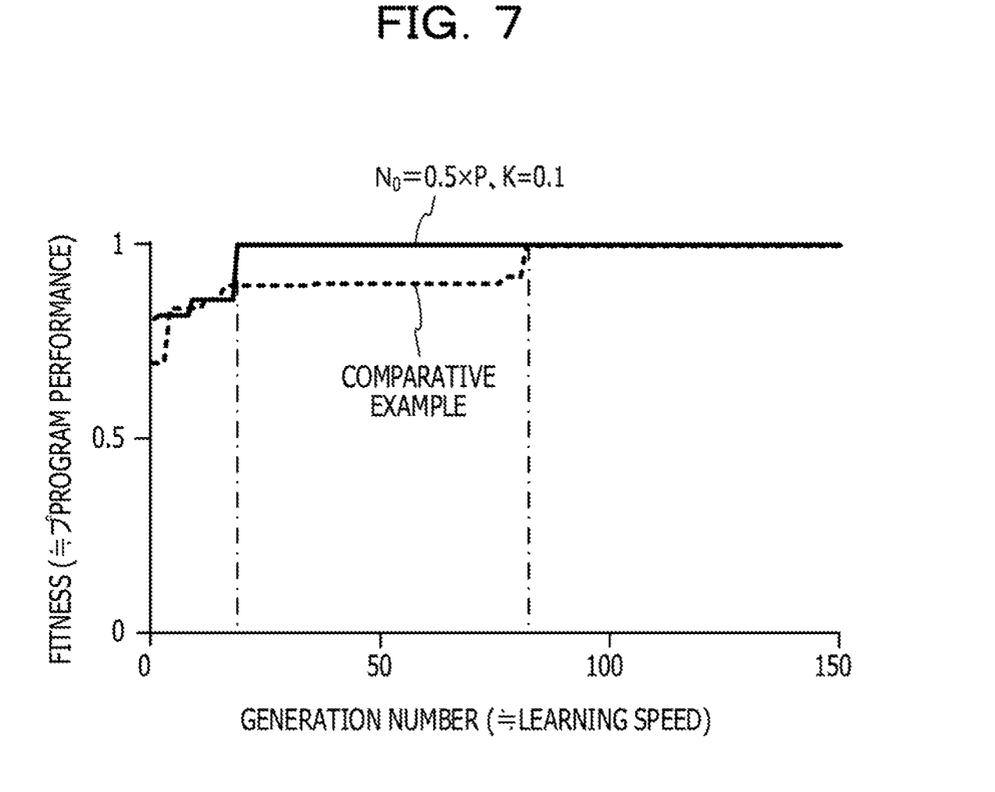
FIG. 7 illustrates functions and effects of an embodiment.

FIG. 7 is a graph of a change in a fitness relative to a generation number in a case where relearning is executed by a method similar to that illustrated in FIG. 5 (comparative example) and in a case where relearning is executed by the method illustrated in FIG. 5 ($N_0=0.5\times P$, K=0.1). The generation number means how many times replacement is performed on the population. The fitness is synonymous with program performance. The fitness whose value is nearer to 1 means that the program performance is higher. For example, the generation number until the fitness takes a predetermined value (e.g., 1) means a learning speed.

As Illustrated in FIG. 7, it was found that early convergence of learning enables reduction in relearning time in the case where relearning is executed by the method illustrated in FIG. 5, as compared with the comparative example. In the example illustrated in FIG. 7, it was found that the learning speed is increased by about four times.

As described above in detail, according to the present embodiment, the determination unit 121 determines a plurality of initial individuals, and adds the initial individuals to the population 11, and the extraction unit 122 extracts two parent individuals from the population 11. The generation unit 123 generates child individuals from the parent individuals thus extracted, on the basis of genetic programming, and the processing unit 124 calculates fitnesses of the child individuals, using learning data items, and determines image processing programs for use in image processing or updates the population 11, on the basis of the fitnesses thus calculated. In this case, the determination unit 121 determines at least some of individuals included in the population 11 upon preceding determination of the image processing programs for use in image processing, as some of initial individuals in a relearning process. According to the present embodiment, as described above, the image processing programs obtained by the preceding learning are used as some of the initial individuals in the population 11 at the time of relearning. This configuration therefore enables a search for an individual having a higher fitness at an early stage, as compared with a case where all the initial individuals are randomly generated. In addition, the individuals obtained by the preceding learning are not used as all of the initial individuals at the time of relearning. This configuration therefore enables prevention of an excessive learning state in the preceding learning.

Also in the present embodiment, the determination unit 121 calculates fitnesses of image processing programs obtained by the preceding learning, using new learning data items, and determines image processing programs to be included in the population 11, on the basis of the fitnesses thus calculated. This configuration thus enables addition of image processing programs each having a higher fitness to the population 11 from the beginning of relearning. This configuration therefore enables a determination of a definitive image processing program in a short time.

Also in the present embodiment, the extraction unit 122 determines whether to select, as a first parent individual, an individual obtained by preceding learning and select, as a second individual, an individual generated newly (S118B) or to randomly select two parent individuals (S118C), on the basis of a ratio of image processing programs that are obtained by the preceding learning and are included in the population 11 at the time of relearning. In a case where the population 11 includes a large number of image processing programs obtained by the preceding learning, this configuration enables reduction in time for relearning by positively selecting, as a parent individual, an image processing program whose fitness is higher, the image processing program being obtained by the preceding learning. In a case where the population 11 does not include so much image processing programs obtained by the preceding learning, this configuration enables reduction in time for relearning by randomly selecting parent individuals from the population 11 including image processing programs obtained by repetition of evolutionary progression.

In the foregoing embodiment, the individuals obtained by the preceding learning are used as some of the initial individuals at the time of relearning; however, the initial individuals are not limited thereto. For example, the initial individuals are not necessarily limited to the individuals obtained by the preceding learning as long as the individuals are obtained before the relearning.

In the foregoing embodiment, two parent individuals are extracted from the population 11; however, the number of parent individuals to be extracted is not limited thereto. For example, the number of parent individuals to be extracted may be three or more. In the case of extracting three or more parent individuals, in step S118B, one of a pair of parent individuals for use in crossover of evolutionary progression may be an individual selected from among individuals obtained by preceding learning, and the other parent individual may be an individual selected from among individuals generated newly.

In the foregoing embodiment, the values $N_i$ and K used in the flowchart of FIG. 5 may be appropriately adjusted so as to satisfy accuracy to be desired and a processing time to be desired.

In the foregoing embodiment, a determination based on the ratio of image processing programs obtained by the preceding learning and included in the population 11 is made in step S118A; however, the determination is not limited thereto. For example, a determination may be made on the basis of the number of image processing programs obtained by the preceding learning and included in the population 11. In step S118A illustrated in FIG. 5, a determination as to which one of steps S118B and S118B is executed may be made on the basis of how many times the loop (S204 to S208 in FIG. 6) is repeatedly executed.

The processing functions described above may be actualized by a computer. A program to be provided in this case describes therein details of processing functions to be exerted by the processing apparatus. The foregoing processing functions are implemented on the computer in such a manner that the computer executes the program. The program having the details of processing functions described therein may be recorded on a computer-readable recording medium (except for a carrier wave).

In distributing the program, for example, the program is sold in a form of a portable recording medium such as a digital versatile disc (DVD), a compact disc read only memory (CD-ROM), or the like on which the program is recorded. Alternatively, the program may be stored in a storage device of a server computer, and may be transferred from the server computer to another computer via a network.

The computer that executes the program stores in its storage device, for example, the program recorded on the portable recording medium or the program transferred from the server computer. The computer then reads the program from its storage device, and executes a process according to the program. The computer may also directly read the program from the portable recording medium to execute a process according to the program. Alternatively, each time the program is transferred from the server computer to the computer, the computer may sequentially execute the process according to the received program.

The foregoing embodiments are merely preferable examples discussed herein. However, the embodiments discussed herein are not limited thereto, and various modifications and variations may be made without departing from the scope of the invention.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus comprising:
   a memory; and
   a processor coupled to the memory and the processor configured to:
      determine a plurality of initial image processing programs,
      add the plurality of initial image processing programs to an image processing program group,
      extract at least two image processing programs from the image processing program group,
      generate a candidate of a next-generation image processing program from the extracted image processing programs, based on genetic programming,
      calculate a fitness of the candidate of the next-generation image processing program, using a learning data item including an input image and a target processing result, and
      execute one processing of determine processing for determining the next-generation image processing program and update processing for updating the image processing program group, based on the calculated fitness,
   wherein the processor is configured to determine, as some of the initial image processing programs, at least some of first image processing programs included in the image processing program group upon previous determination of a next-generation image processing program.

2. The information processing apparatus according to claim 1, wherein the processor is configured to:
   calculate fitnesses of the first image processing programs, using learning data items based on images newly captured by the image capturing device, and
   determine as some of the initial image processing programs, image processing programs selected from among the first image processing programs, based on the calculated fitnesses.

3. The information processing apparatus according to claim 1, wherein the processor is configured to
   randomly select all image processing programs to be extracted, from the image processing program group, based on a ratio or number of first image processing programs included in the image processing program group.

4. The information processing apparatus according to claim 1, wherein the processor is configured to
   randomly select some of image processing programs to be extracted, from among the first image processing programs, based on a ratio or number of first image processing programs included in the image processing program group.

5. The information processing apparatus according to claim 1, wherein the processor is configured to
   randomly select other image processing programs from among image processing programs other than the first image processing programs included in the image processing program group, based on a ratio or number of first image processing programs included in the image processing program group.

6. The information processing apparatus according to claim 1, wherein the processor is configured to
   randomly select all image processing programs to be extracted, from the image processing program group when a ratio or number of first image processing programs included in the image processing program group is smaller than a predetermined value.

7. An information processing method executed by a computer, the information processing method comprising:
   determining a plurality of initial image processing programs and adding the plurality of initial image processing programs to an image processing program group;
   extracting at least two image processing programs from the image processing program group;
   generating a candidate of a next-generation image processing program from the extracted image processing programs, based on genetic programming;
   calculating a fitness of the candidate of the next-generation image processing program, using a learning data item including an input image and a target processing result; and
   executing one processing of determine processing for determining the next-generation image processing program and update processing for updating the image processing program group, based on the calculated fitness,
   wherein the determining includes determining, as some of the initial image processing programs, at least some of first image processing programs included in the image processing program group upon previous determination of a next-generation image processing program.

8. A non-transitory computer-readable storage medium storing a program that causes a computer to execute a process, the process comprising:
   determining a plurality of initial image processing programs and adding the plurality of initial image processing programs to an image processing program group;
   extracting at least two image processing programs from the image processing program group;
   generating a candidate of a next-generation image processing program from the extracted image processing programs, based on genetic programming;
   calculating a fitness of the candidate of the next-generation image processing program, using a learning data item including an input image and a target processing result; and
   executing one processing of determine processing for determining the next-generation image processing program and update processing for updating the image processing program group, based on the calculated fitness,
   wherein the determining includes determining, as some of the initial image processing programs, at least some of first image processing programs included in the image processing program group upon previous determination of a next-generation image processing program.

* * * * *